April 27, 1965     J. E. SEITNER     3,181,133
TAPE-SPEED COMPENSATION UTILIZING PHASE-LOCKED LOOP
DETECTORS FOR USE IN TELEMETERING SYSTEMS
Filed May 29, 1961     5 Sheets-Sheet 1
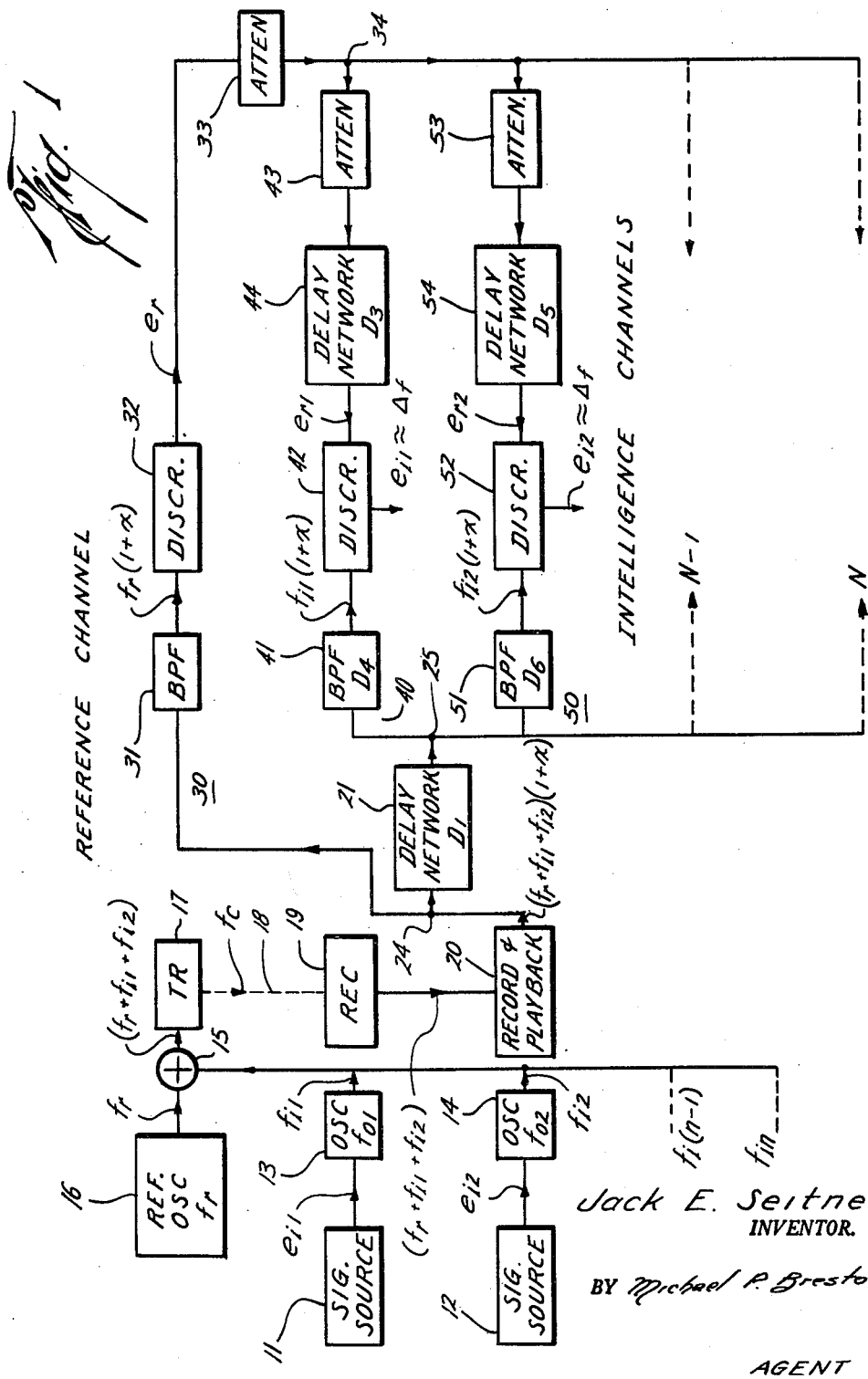
Jack E. Seitner
INVENTOR.
BY Michael P. Breston
AGENT

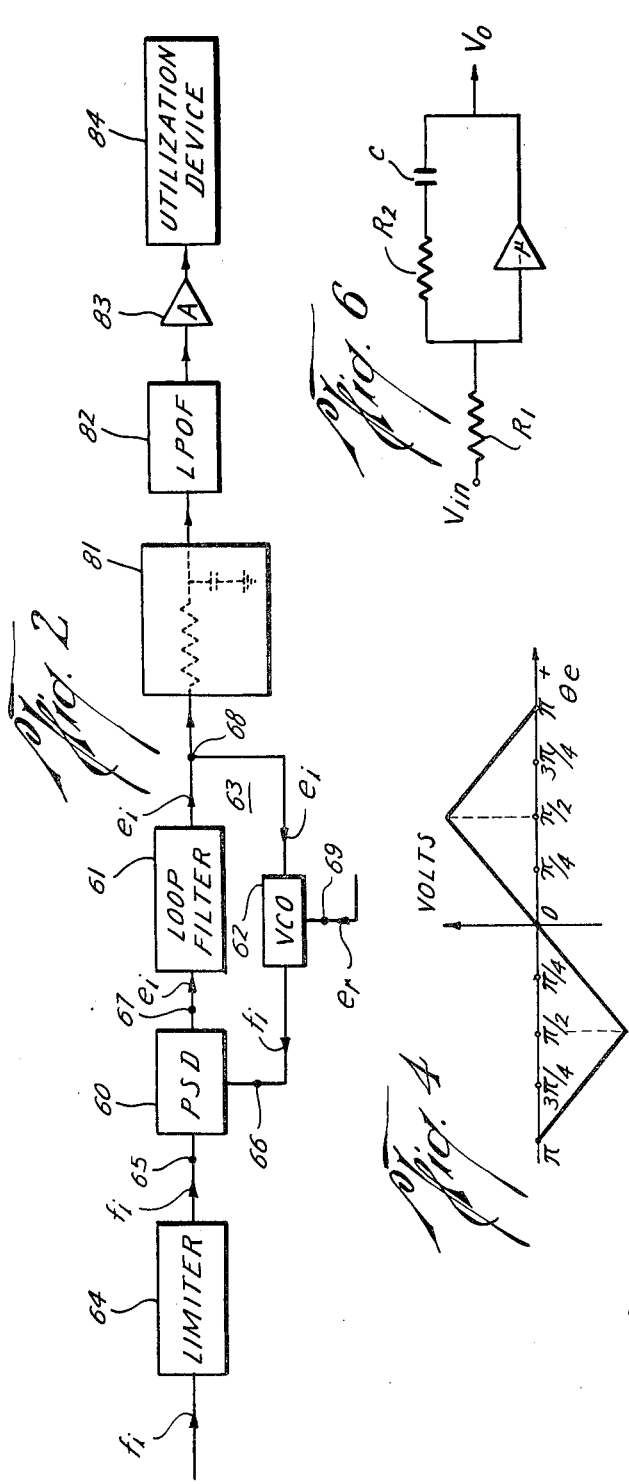
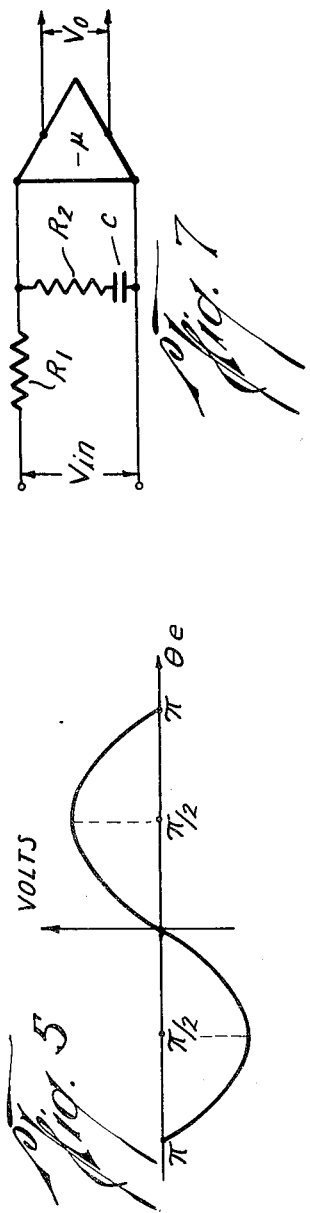

Jack E. Seitner
INVENTOR.

BY Michael P. Breston

AGENT

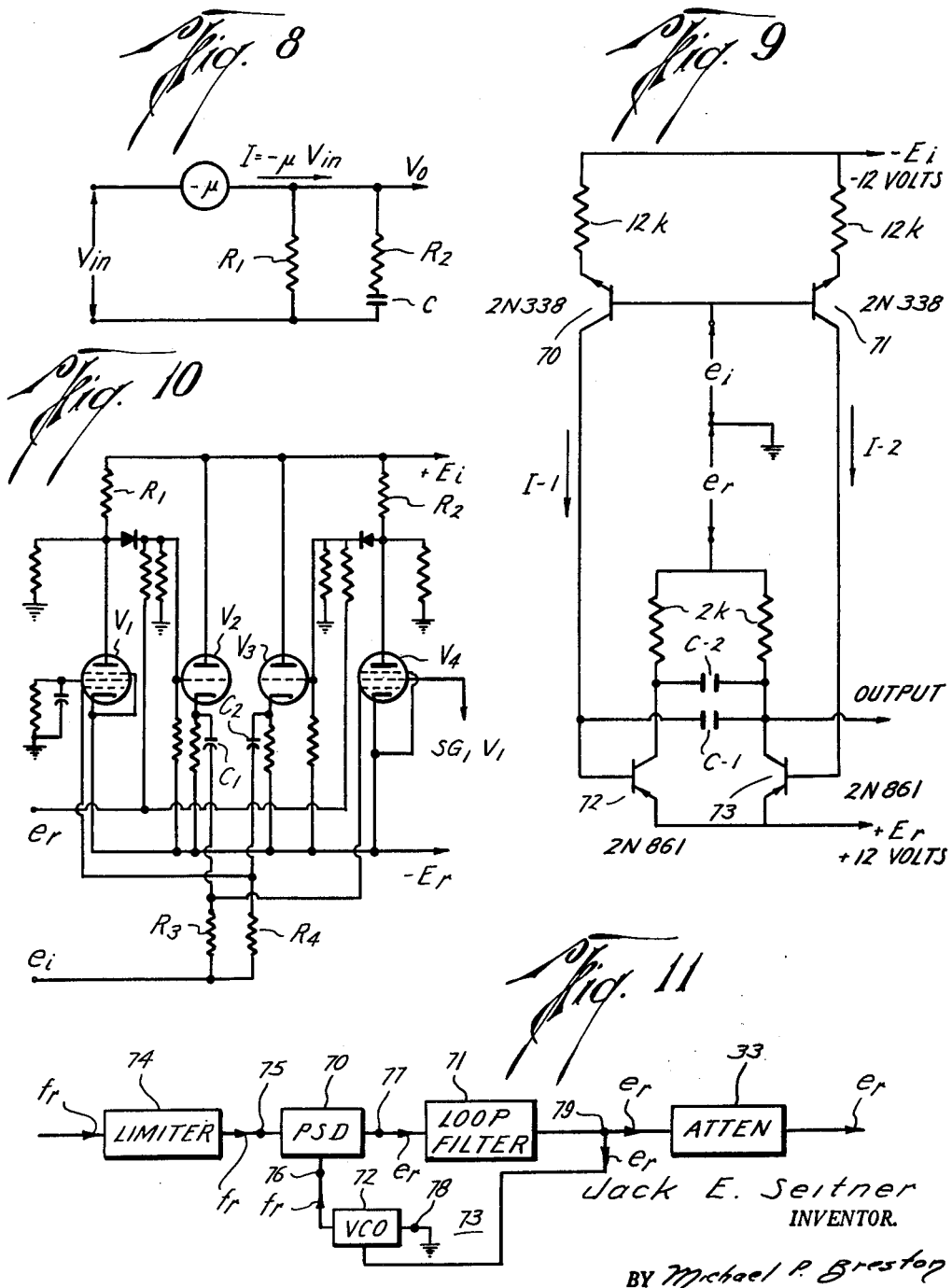

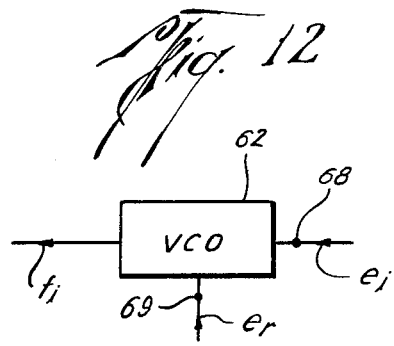
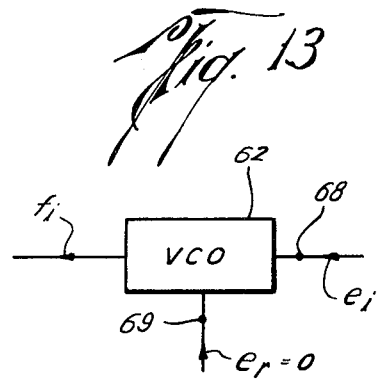
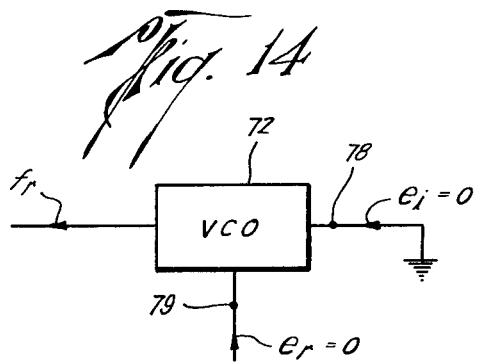
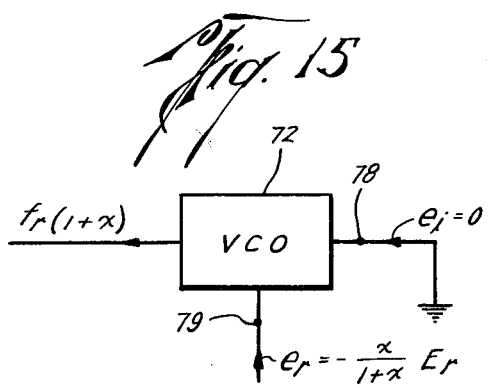
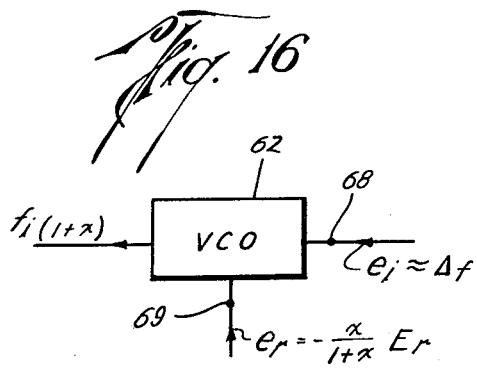
Jack E. Seitner
INVENTOR.
BY Michael P. Breston
AGENT United States Patent Office 3,181,133
Patented Apr. 27, 1965

3,181,133
TAPE-SPEED COMPENSATION UTILIZING PHASE-LOCKED LOOP DETECTORS FOR USE IN TELEMETERING SYSTEMS
Jack E. Seitner, Sarasota, Fla., assignor to Electro-Mechanical Research, Inc., Sarasota, Fla., a corporation of Connecticut
Filed May 29, 1961, Ser. No. 113,184
3 Claims. (Cl. 340—174.1)

This invention relates generally to telemetering systems and more particularly to tape-speed compensation used for telemetering apparatus employing phase-locked loop detectors.

In telemetering instrumentation system employed for example to monitor the operation of airborne vehicles, the received time modulated intelligence subcarrier waves are often recorded, together with a reference unmodulated wave, on a suitable recording medium such as magnetic tape. Variations in the speed of the tape during either the recording or playback give rise to frequency shifts resulting from "wow-and-flutter" error modulations imposed on each of the recorded signal waves. If the tape-driving mechanism is poorly regulated and no tape-speed compensation is employed, then the wow-and-flutter errors impose relatively great amplitude and frequency distortions upon the transmitted intelligence information through the telemetering channels.

To discriminate frequency modulated waves under severe transmission conditions resulting in low signal-to-noise ratios, phase-locked loop detectors can be employed to great advantage because of their inherent ability, when properly utilized, to improve the channels' signal-to-noise ratios. The detector's loop can be made to exhibit an optimally narrow bandwidth centered about the instantaneous incoming frequency within the channel's passband. Such a detector may be properly considered as a "tracking filter" capable of greatly attenuating the channel's noise signals falling outside the loop's pass-band.

In telemetering systems employing FM detectors to demodulate the transmitted intelligence subcarrier signals, to achieve tape speed compensation, a compensating signal, corresponding to the wow-and-flutter errors on the reference wave, is conventionally applied to each detector. In order to obtain complete error compensation for relatively small as well as large errors, the magnitude, phase, and frequency of the compensating signal must be properly related to the wow-and-flutter errors.

In telemetering systems employing phase-locked loop detectors, this compensating signal can be derived in accordance with this invention by connecting the loops of the intelligence and of the reference detectors in an inverse or complementary manner so as to automatically and synchronously remove the distorting effects caused by the frequency shifts upon the demodulated output signals of the intelligence discriminators.

Accordingly, it is a general object of this invention to provide new and improved telemetering systems employing phase-locked loop discriminators for processing recorded time-modulated subcarriers subject to record speed variations.

It is another object of this invention to provide new and improved phase-locked loop discriminating systems for processing recorded signals which require a minimum of components and which automatically and uniformly remove relatively small as well as large wow-and-flutter errors.

Briefly, these and other apparent objects of this invention are attained by processing each recorded intelligence carrying subcarrier signal through an intelligence phase-locked loop detector and the recorded reference frequency through a reference phase-locked loop detector. Eace phase-locked loop detector includes a double input oscillator whose frequency can be simultaneously and selectively regulated by first and second input signals applied respectively to first and second input terminals. The oscillator's frequency is substantially directly linearly related to the amplitude of the first signal and inversely linearly related to the amplitude of the second signal. If the loop of the intelligence detector is "locked" to the first input terminal of its oscillator, then for perfect compensation the loop of the reference discriminator should be "locked" to the second input terminal of its oscillator, or vice versa. Thus, the phase-locked loop of the reference detector is connected in an inverse or complementary manner relative to the phase-locked loop of the intelligence detector. The employment of complementary phase-locked loops by the intelligence and reference detectors assures complete wow-and-flutter error compensation independently of the errors' magnitudes.

Additional objects and advantages of this invention will become apparent from the following detailed description of representative embodiments thereof when taken in conjunction with the accompanying drawings, in which:

FIG. 1 is a block diagram schematically illustrating a telemetering system employing phase-locked loop detectors in accordance with this invention;

FIG. 2 is a block diagram schematically illustrating a typical intelligence FM discriminator which can be employed in each of the intelligence channels of FIG. 1;

FIGS. 4 and 5 show graphs of the output D.C. component of the phase-sensitive detector, in volts, as a function of the input-phase error, in radians, when the signals applied thereto are square waves and sine waves, respectively;

FIGS. 6–8 show illustrative networks which can be employed as the loops' stabilizing filters;

FIG. 9 is a schematic representation of one embodiment of the loop's voltage-controlled oscillator;

FIG. 10 is another embodiment of the loop's voltage-controlled oscillator;

FIG. 11 is a block diagram representation of a typical reference FM discriminator which can be used in the reference channel of FIG. 1; and FIGS. 12 to 16 are block diagrams useful in deriving the various relationships between the applied control voltages to the oscillator and the resulting variations in the frequency of its output oscillations.

Figure 3A:
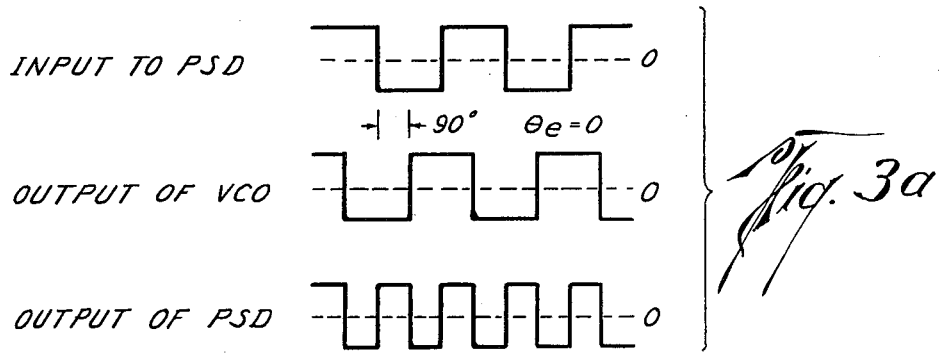
FIGS. 3a–3c show input square waves, with varying phase relationships, applied to the phase sensitive detector of FIG. 2 and the resulting output waveforms therefrom.

In FIG. 1, signal sources 11 and 12, typically electromechanical transducers, generate D.C. or A.C. electrical information signals $e_{i1}$ and $e_{i2}$ which respectively modulate the mean or center frequencies $f_{o1}$ and $f_{o2}$ of subcarrier oscillators 13 and 14. The output frequency modulated subcarrier signals $f_{i1}$ and $f_{i2}$ from oscillators 13 and 14 are linearly added by adder 15 to an unmodulated reference frequency signal $f_r$, generated by a stable reference oscillator 16. The output complex subcarrier signal from adder 15 is typically multiplexed on the carrier signal $f_c$ of a transmitter 17. The multiplexed carrier is then transmitted via a transmission path 18, such as a radio link, to a receiver 19. After demodulating the carrier, receiver 19 reproduces the complex subcarrier signal which is often recorded on a suitable recording medium, such as magnetic tape, by a record-and-playback unit 20. If time variations are introduced by unit 20, as a result, for example, of variations in the speed of the tape's driving mechanism during either the recording or the playback, then each of the constituent recorded signals composing the complex subcarrier signal will be frequency-shifted or multiplied by $(1+X)$, where X is defined as the fractional error $\Delta f/f$, and $\Delta f$ is the frequency shift imposed upon a signal having a frequency $f$. In sum, both the recording and the playing back of the complex subcarrier signal may give rise to wow-and-flutter (meaning low-and-high frequency) errors or frequency shifts which effectively modulate each constituent signal forming the complex subcarrier.

To selectively and simultaneously process each intelligence subcarrier, N Intelligence Channels are provided, one for each intelligence subcarrier. And to assist in deriving from the error-modulated reference wave a compensating signal, there is also provided a Reference Channel 30. All N Intelligence Channels, only two of which 40 and 50 are shown to simplify the drawings, are connected in parallel at junction 25 to the output of a delay network 21, which is in turn coupled to the output of playback unit 20 at junction 24. On the other hand, the Reference Channel 30 is conveniently connected directly to the playback unit's output.

The Reference Channel 30 includes an input band-pass filter (BPF) 31 having a pass-band which is centered about the reference frequency $f_r$ and is of sufficient width to pass the wow-and-flutter frequency shifts. Similarly, the Intelligence Channels 40 and 50 respectively include input band-pass filters 41 and 51 for extracting from the complex subcarrier signal their corresponding subcarrier frequency bands $f_{i1}$ and $f_{i2}$. The bandwidths of filters 41 and 51 are suitably selected to pass substantially unattenuated their assigned maximum and minimum frequencies.

In each channel, the selected output wave of the BPF is applied to a frequency discriminator providing an output signal which is a function of the frequency deviations about the channel's mean frequency. Thus, the output of the reference discriminator 32 is a signal $e_r$ which is a predetermined function of the fractional wow-and-flutter error X. This function is such that if X is negligible or zero, then the output of the reference discriminator 32 is also negligible or zero. On the other hand, the output of each intelligence discriminator is a signal $e_1$ whose amplitude is directly proportional to the frequency deviations $\Delta f$ from the mean frequency $f_i$.

In order to compensate for the wow-and-flutter errors existing in each Intelligence Channel, the output signal $e_r$ of the reference discriminator 32, after being suitably attenuated and delayed, is applied as a compensating signal to each intelligence discriminator. Thus, $e_r$ is first passed through an attenuator 33 and then applied to each Intelligence Channel at junction 34.

In the first intelligence Channel 40, before reaching the intelligence discriminator 42, the compensating signal $e_{r1}$ is passed via an attenuator network 43 and a delay network 44. Similarly, in the second Intelligence Channel 50, the compensating signal $e_{r2}$ is first passed via an attenuator network 53 and a delay network 54 and then applied to discriminator 52.

To automatically and completely remove the wow-and-flutter errors from the output of the intelligence discriminator 42, i.e., to make $e_{i1}$ completely independent of X, the compensating signal $e_{r1}$ must have a suitable amplitude, phase, and mathematical function of X.

The amplitude of $e_{r1}$ is determined by the attenuator networks 33 and 43 which may be, for example, amplifiers or voltage dividers.

The phase of $e_{r1}$ is determined by the delay network 44 which has a time delay $D_3$ equal to the time delay $D_4$ of BPF 41. Now, if the time delay $D_1$ imposed upon all the modulated signals by delay network 21 is made equal to the total time delay imposed upon the reference wave passing through the Reference Channel 30 (from junction 24 to junction 34) then, the compensating signal $e_{r1}$ will have a proper phase in relation to the subcarrier signal $f_{i1}$ arriving from the output of BPF 41. By analogy, the compensating signal $e_{r2}$, in the second Intelligence Channel 50, will have proper phase in relation to the intelligence subcarrier signal $f_{i2}$, when both signals are applied to the intelligence discriminator 52, provided that the time delay $D_5$ of delay network 54 is made equal to the time delay $D_6$ of BPF 51. Delay networks 21, 44 and 54 should provide a constant delay independent of frequency and should not introduce amplitude distortions, else the amplitude of the compensating signal will be distorted. Preferably, network 21 is a delay line, whereas networks 44 and 54 are analog-type filters or other maximally linear phase shift networks.

Finally, the necessary mathematical function, relating the compensating signal $e_r$ to the fractional error X, is determined by the internal arrangement of the networks within the phase-locked loops of the intelligence and reference detectors.

As a result of extensive theoretical and experimental studies of phase-locked loop discriminating systems, I have determined what the precise function must be in order to obtain complete tape-speed compensation regardless of the magnitude of the speed error. The compensation is theoretically complete and is limited, if any, only by the quality of the employed components. I have further determined that, if a phase-locked loop reference detector is employed to obtain the compensating signal $e_r$, the reference and the intelligence phase-locked loops must be connected in a complementary manner in order to yield the desired exact mathematical function, as is fully explained in the following description.

In FIG. 2 is shown a simple intelligence discriminator having a phase-locked loop detector which includes three essential networks: a phase-sensitive detector (PSD) 60, a loop stabilizing filter 61, and a voltage-controlled oscillator (VCO) 62, all cascaded around a loop 63 as shown. The most common signals applied to the inputs 65 and 66 of the PSD 60 are square or sinusoidal waves. If square waves are desired instead of sine waves, the PSD 60 is preceded by a limiter 64 which converts the sinusoidal subcarrier $f_i$ from the output of the BPF into a square wave of substantially constant amplitude, and the VCO 62, instead of being a sine wave generator, is a square wave generator such as a free-running multivibrator.

Figure 3B:
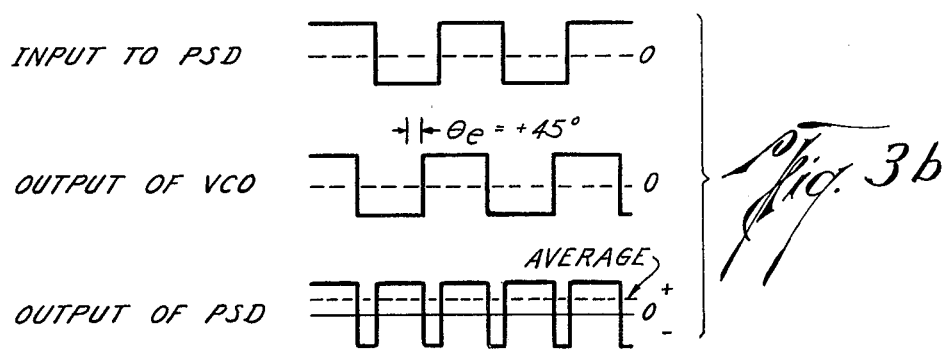
Figure 3C:
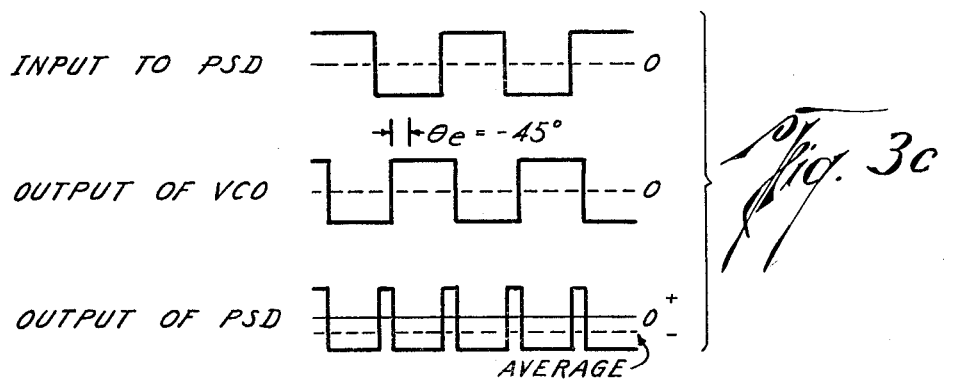

In FIGS. 3a–3c are shown typical input square waves to the PSD 60, shifted in phase by various amounts, and the corresponding output waveforms.

In FIG. 3a the phase shift between the subcarrier wave $f_i$, applied to input terminal 65 of PSD 60, and the output wave of the VCO 62, applied to input terminal 66, is 90°. The PSD 60 multiplies the two input square waves to furnish their product which is also a square wave whose average or D.C. component is zero. The 90° phase shift between the applied signals to the PSD is taken as the static or reference condition, which corresponds to an "input-phase error" $\theta_e$ of 0°.

In FIG. 3b, the phase error $\theta_e$ between the two input square waves to the PSD is +45° from the reference condition, thus making the output product a rectangular wave whose positive going pulses have a longer time duration than the negative pulses. The output rectangular wave now has a positive D.C. component and a fundamental double frequency ripple.

In FIG. 3c, the phase error $\theta_e$ between the two input square waves to the PSD is −45° from the reference condition, making the resultant output product a rectangular wave, now having a negative D.C. component and a fundamental double frequency ripple.

By analogy, the output waveform of the PSD for any other phase error $\theta_e$ within its linear range may be derived by simply multiplying the two input square waves.

In sum, if it is assumed that, due to the action of the phase-locked loop 63, the two input square waves to the PSD are of the same frequency, then the average output of the PSD is proportional to their phase difference, i.e., to the input phase error $\theta_e$. Under static operation, the phase error $\theta_e$ is substantially zero, corresponding to the condition shown in FIG. 3a; whereas under dynamic operation, the instantaneous phase error fluctuates in response to the existing frequency modulations on the incoming wave and, depending on the dynamic response of the loop 63, the average output of the PSD will vary in correspondence with these modulations.

In FIG. 4 is shown a graph of the average output signal of the PSD as a function of the input dynamic phase error for the case when the two input signals to the PSD are square waves. When the phase shift is 90°, corresponding to the reference condition of $\theta_e=0$, the average output of the PSD is zero. When the phase error changes from zero to $\pm\pi/2$, the output D.C. component varies nearly linearly with the phase error. When the phase error equals $|\pi/2|$, the average output reaches a peak value and, thereafter, decreases with increasing phase errors. Thus, in the case of square waves, the linear operation of the phase-sensitivie detector is limited to a range extending from zero to $\pm\pi/2$. Therefore, to obtain linear operation and allow for phase errors engendered by noise, static, drifts, etc., which could cause the loops to lose "lock," the optimum allowable phase error $\theta_e$ is usually restricted to a value lying between 30° to 70°.

It can be easily demonstrated that, if the two input signals to the phase-sensitive detector were sine waves, instead of square waves (i.e., if no limiter 64 were employed), the average output signal of the PSD 60, as shown in FIG. 5, would vary sinusoidally as a function of $\theta_e$, since, as previously explained, the PSD acts as a multiplier. In FIG. 5, the reference condition or zero phase error is again taken to be the case when the phase shift between the input sine waves to the PSD is 90°. As the dynamic phase error $\theta_e$ between the sine waves shifts from this static condition, the average output of the PSD increases or decreases in dependence upon an increase or decrease in the phase error. Again, the peak output of the PSD is attained when the phase error reaches $|\pi/2|$. It will be appreciated that, in the case of sine waves, the nearly linear range of operation of the PSD is substantially reduced compared to the case of square waves. Therefore, in the preferred embodiment of my invention, square waves rather than sine waves are applied to the input terminals 65 and 66 of the PSD 60.

In sum, in either FIG. 4 or FIG. 5, the average output potential of the PSD 60 is substantially zero when no modulations are present on the incoming signal $f_1$. And when, due to frequency deviations from the center frequency caused by either the transmitted intelligence or by the wow-and-flutter errors, the incoming signal $f_1$ begins to advance or retard in frequency, then the corresponding phase error $\theta_e$ (shifted 90°) is substantially instantaneously detected by the PSD to provide an output wave whose D.C. component has an amplitude and polarity respectively related to the magnitude and direction of the resulting phase error $\theta_e$.

Referring back to FIG. 2, the output signal $e_1$ of the phase-sensitive detector 60 is applied to the loop's stabilizing filter 61. Essentially, the function of this filter is to allow the D.C. component in the output wave of the PSD to pass therethrough while greatly attenuating the A.C. ripple, thereby establishing the necessary dynamic conditions for proper tracking by the loop 63.

As a result, the filtered signal $e_1$, now appearing at the output terminal 68 of the loop's filter 61, represents the frequency shifts in the incoming wave $f_1$ about its mean value.

To synchronize the oscillator's frequency with the incoming frequency and to establish the static 90° phase shift, the output frequency of the voltage-controlled oscillator 62 is modulated about its center frequency by $e_1$. The VCO output frequency can also be controlled by $e_r$, applied to terminal 69, which represents, as previously explained, the wow-and-flutter frequency shifts carried by the reference signal.

The change in the oscillator's frequency, in response to both input control voltages $e_1$ and $e_r$, is in a direction to bring the output frequency of the oscillator to about the same frequency as that of the incoming signal $f_1$, applied to input terminal 65 of the PSD 60. In order to reduce the average output signal of the PSD to zero, the dynamic loop response will tend to bring the loop to its static condition, i.e., to maintain a 90° phase shift between the incoming signal applied to terminal 65 and the output frequency of VCO 62 applied to terminal 66. In other words, the change in the oscillator's frequency about its mean or center frequency, in response to the two input control voltages $e_1$ and $e_r$, is of such magnitude and direction as to seek to eliminate the phase error $\theta_e$ and to synchronize the oscillator's output frequency with the incoming wave. The PLL detector acts as a synchronous detector.

For the loop 63 to have a proper dynamic response, the loop's filter 61 must have, as is known in the art, a transfer function $G(s)$ which is substantially given by:

$$G(s) = \frac{V_o}{V_{in}} = \mu \frac{T_2 s + 1}{T_1 s + 1} \quad (1)$$

where, $T_1$ and $T_2$ are lag and lead time constants, respectively, $\mu$ is a constant, and $s$ is the Laplacian operator.

There is a wide variety of networks whose transfer functions could satisfy Equation 1. In FIGS. 6, 7, and 8 are shown representative networks each of which can be employed as the loop's filter. These networks will amplify the input D.C. component and practically completely cancel out the A.C. ripple.

The voltage-controlled oscillator 62 can also assume a wide variety of forms. For example, in FIG. 9 is shown a free-running (or a stable) multivibrator controllable by two control signals $e_1$ and $e_r$. Transistors 70 and 71 merely act as constant current sources for respectively supplying charging currents I–1 and I–2 to the timing capacitors C–1 and C–2. Potentials $E_1$ and $E_r$ are quiescent. The control signals $e_1$ and $e_r$ respectively control the rate of charge and the time of discharge of the frequency-determining capacitors C–1 and C–2. Each of transistors 72 and 73 is alternately OFF and ON. If transistors 70 and 72 are respectively matched to transistors 71 and 73, if C–1=C–2, and if the resistors and the potentials are matched as indicated by the suggested typical numerical values, then the general governing equation for the frequency $f_1$ of the oscillations of the free-running multivibrator of FIG. 9 can be written as:

$$f_1 = K \frac{E_1 + e_1}{E_r + e_r} \quad (2)$$

where K is a constant.

Another illustrative multivibrator, shown in FIG. 10, can also be utilized in the phase-locked loop detector. Tube $V_1$, resistors $R_1$, $R_3$, and capacitor $C_1$ form one "half" of the multivibrator, whereas tube $V_4$, resistors $R_2$, $R_4$, and capacitor $C_2$ form the other "half." Both "halves" are preferably matched to obtain symmetrical operation. Tubes $V_2$ and $V_3$ merely act as coupling cathode followers. Again, the control signals $e_1$ and $e_r$ respectively control the rate of charge and the time of discharge of capacitors $C_1$ and $C_2$. It can be shown that for practical values of applied voltages, the governing equation for the frequency of the multivibrator of FIG. 10 is substantially the same as that given by Equation 2. Other sweep generators, such as the Miller and Bootstrap sweep circuits, can also be used to provide the constant charging current to the timing capacitors of the multivibrator.

It will be appreciated from an analysis of Equation 2 that the VCO output frequency is directly linearly related to the control signal $e_1$ and inversely linearly related to the control signal $e_r$. More specifically, the frequency and the period of the VCO are, respectively, directly linearly related to $e_1$ and $e_r$. Therefore, it will be helpful hereinafter to refer to input terminal 68 of the VCO of FIG. 2 as the "frequency varying" terminal and to input terminal 69 as the "period varying" terminal.

The description thus far related to the intelligence discriminator shown in FIG. 2.

In FIG. 11 are shown, in block diagram form, the networks of a simple reference discriminator. Since the networks in the reference discriminator perform the same functions as their corresponding networks in the intelligence discriminator, no detailed description of FIG. 11 is needed. For ease of identification, each of the numerals assigned to the networks of FIG. 11 is shifted upwardly by ten from its corresponding numeral in FIG. 2.

A comparison of FIG. 11 with FIG. 2 will reveal that, whereas the phase-locked loop 63, in the intelligence discriminator, is "locked" to the frequency-varying input 68, the phase-locked loop 73, in the reference discriminator, is "locked" to the period-varying input 79, while the frequency input 78 is conveniently grounded. This can simply be done in the VCO of FIG. 9, for example, by connecting the bases of transistors 70 and 71 to ground, that is, by making $e_i = 0$. Inversely, if the intelligence phase-locked loop 63 were locked to the period-varying input 69, then the reference phase-locked loop 73 should be locked to the frequency varying input 78 and its period-varying input 79 should be grounded.

Consequently, the reference loop 73 differs from the intelligence loop 63 by the manner in which loop 73 is locked to its VCO 72; thus, the loops 63 and 73 are "inversely" locked. The relation between the output signal of each loop, as derived from the output of the loop's filter, and the VCO output frequency, which is substantially equal to the frequency of the incoming signal to the PSD, may be obtained from an analysis of the voltage-versus-frequency response of each VCO.

Thus, in FIG. 12 is shown a general block diagram representation of VCO 62 having an output frequency $f_i$ which is controllable by two control voltages $e_i$ and $e_r$, both applied respectively to the frequency varying input 68 and to the period varying input 69.

For convenience, Equation 2, governing the operation of VCO 62, is repeated, $$f_i = K \frac{E_i + e_i}{E_r + e_r} \quad (3)$$

where, $K$, $E_i$, and $E_r$ = constants;
$e_i$ = the output signal of the intelligence loop 63;
$e_r$ = the output signal of the reference loop 73; and
$f_i$ = the oscillator's output frequency.

In FIG. 13, in the absence of wow-and-flutter errors, the output signal $e_r$ of the reference channel is substantially equal to zero and, therefore, Equation 3 may be rewritten as, $$f_i = K \frac{E_i + e_i}{E_r} \quad (4)$$

Equation 4 represents the "ideal" linear operation of the intelligence discriminator in the absence of wow-and-flutter errors. Because $f_i$ is directly linearly related to $e_i$, and $f_i$ is synchronized with the incoming subcarrier frequency, $e_i$ must represent the intelligence transmitted through the Intelligence Channel.

FIG. 14 is a representation of the VCO 72, in the reference phase-locked loop 73, operating under no wow-and-flutter errors. Since $e_r = e_i = 0$, its output frequency $f_r$ is constant and is given by, $$f_r = K \frac{E_i}{E_r} \quad (5)$$

FIG. 15 is a representation of the VCO 72 now operating under wow-and-flutter errors. The output frequency of the VCO 72 is multiplied by $(1+X)$, where $X$ is, as previously defined, the fractional frequency error. The governing equation of the reference VCO 72 now becomes, $$f_r(1+X) = K \frac{E_i}{E_r + e_r} \quad (6)$$

Solving Equation 6 for $e_r$ and substituting Equation 5 for $f_r$, yields:

$$e_r = -\frac{X}{1+X} E_r \quad (7)$$

FIG. 16 is a representation of the intelligence VCO 62 now also operating under wow-and-flutter errors. The output frequency of the VCO 62 is $f_i(1+X)$, which is related to $e_i$ and $e_r$ as follows, $$f_i(1+X) = K \frac{E_i + e_i}{E_r + e_r} \quad (8)$$

Substituting the value of $e_r$, as given by Equation 7, into Equation 8 yields, $$f_i = k \frac{E_i + e_i}{E_r} \quad (9)$$

Equation 9 is identical to Equation 4 which, as previously explained, governs the intelligence VCO 62 of FIG. 13 in the absence of wow-and-flutter errors. Equation 9 reveals that the tape-speed compensation is complete; i.e., the output signal $e_i$ of the intelligence PLL detector is independent of X and is linearly related to the incoming subcarrier frequency $f_i$.

Hence, by operating the reference VCO 72, as shown in FIG. 15, in an inverse or complementary manner to the operation of the intelligence VCO 62, complete wow-and-flutter error compensation is achieved regardless of the magnitudes of the wow-and-flutter errors.

An analysis, similar to the one presented above in conjunction with FIGS. 12–16, would readily reveal that if the reference phase-locked loop 73 were not connected in a complementary manner to the intelligence phase-locked loop 63, complete tape-speed compensation could not be achieved.

To complete the description of the intelligence discriminator, reference is again made to FIG. 2. Before applying the output signal $e_i$ of the intelligence phase-locked loop 63, appearing at terminal 68, to a utilization device 84, $e_i$ is first passed through a compensating network 81 (which may include a simple RC filter as shown in dotted form), a low-pass output filter 82 and, if needed, a power amplifier 83. The function of the compensating network 81 is to convert the loop's transfer function $f(s)$ into the standard Butterworth or Thompson form which, in Laplacian terms is $f(s) = 1/P(s)$, where P is a polynomial of the second degree and $s$ is the Laplacian operator. The cut-off frequency of the low-pass output filter 82 is preferably made equal to the highest intelligence frequency transmitted through the intelligence channel. Each intelligence discriminator 42, 52 . . . of FIG. 1 is connected and operated as is the intelligence discriminator of FIG. 2.

To illustrate a typical operation of the telemetering system of FIG. 1, let it be assumed that FIG. 2 corresponds to the intelligence discriminator 42 of the Intelligence Channel 40. Let it be further assumed that it is desired to receive the third standard IRIG subcarrier frequency band having a center frequency of 730 c.p.s., a deviation ratio of 5, and a percent deviation of +7.5%. Then, the band-pass filter 41 will have a center frequency of 730 c.p.s., a lower band edge of 675 c.p.s., and an upper band edge of 785 c.p.s.; the low-pass output filter 82 will have a cut-off frequency of 11 c.p.s. The complex subcarrier signal derived from the playback unit 20, after being delayed by delay network 21, is applied to junction 25. Band-pass filter 41 extracts from the complex signal the desired third subcarrier frequency band corresponding to its pass-band.

The selected subcarrier will be limited by limiter 64 to provide a substantially constant amplitude square wave to the input terminal 65 of the PSD 60. Phase-sensitive detector 60 compares the phase of the output signal of the VCO 62 with the phase of the incoming subcarrier. The average output potential of the PSD 60, appearing at terminal 67, is substantially linearly related to the phase difference, shifted 90°, between the applied signals to terminals 65 and 66. In addition to the average potential appearing at output terminal 67, there also exists a double frequency A.C. ripple, as explained in conjunction with FIGS. 3a–3c. The D.C. component at terminal 67 will pass through the loop's filter 61, whereas the A.C. ripple will be substantially attenuated.

The output D.C. component from filter 61 will change the operating frequency of the VCO 62 in a direction to bring about the cancellation of the phase difference, about the mean phase angle, between the signals applied to the PSD 60. The signal appearing at terminal 68 represents a version of the transmitted intelligence data. This version is first passed through the compensating network 81. Then, the low-pass output filter 82 receives the output of network 81 and substantially attenuates all frequency components which exceed its cut-off frequency of 11 c.p.s. The output demodulated intelligence signal of the low-pass output filter 82 is amplified, if necessary, by power amplifier 83 and then applied to a utilization device 84, such as a meter, recorder, etc.

As previously explained, the complex signal at the output of the playback unit 20 also includes an unmodulated reference frequency $f_r$. In one embodiment of this invention $f_r$ was 25 kc. The band-pass filter 31 in the Reference Channel 30 had a center frequency of 25 kc., a lower band edge of 23.125 kc., and an upper band edge of 26.875 kc. The bandwidth of band-pass filter 31 was selected so as to pass the wow-and-flutter modulations imposed on the reference frequency $f_r$ by the tape speed variations.

The operation of the remaining networks of the reference discriminator 32, shown in detail in FIG. 11, is analogous to the already described operation of the networks in the intelligence discriminator 42, except that the loop output signal $e_r$ is taken from the period varying input 79, rather than from the frequency varying input 78. The magnitude of $e_r$ is such as to bring about the cancellation of the input phase error to the PSD 70. The output signal $e_r$, the amplitude of which is suitably adjusted by network 33, is applied to junction 34. After passing through the attenuator network 43 (which in addition to setting the amplitude also acts as a low-pass filter for $e_r$) and the delay network 44, the compensating signal $e_r$ is applied to the period varying input terminal 69 of the VCO 62 in the intelligence discriminator 42. This compensating signal $e_r$ is of such magnitude, frequency, and phase as to bring about the complete cancellation of the wow-and-flutter errors from the final demodulated output signal $e_i$ of thei ntelligence discriminator 42.

Although the telemetering system was described with reference to a particular standard FM–FM transmission scheme to telemeter sinusoidal or analog data, the system is equally applicable to discriminate data in digital form, such as PDM, PAM, etc., As will be readily understood by a man skilled in the art, the discriminator can find other uses than in telemetry, for example, in radio, television, radar, and other communication systems.

Therefore it will be evident that the described embodiments are susceptible to various modifications in form and design within the scope of the invention as defined in the appended claims.

What is claimed is:

1. In a multi-channel telemetering system for processing a complex signal including a reference signal and at least one intelligence subcarrier signal, said reference and said subcarrier signals being subject to frequency errors; means arranged to receive said complex signal and to separate said reference signal from said intelligence subcarrier; means including an intelligence phase-locked loop detector to demodulate the separated intelligence subcarrier, said detector including signal generating means having a first and a second input terminal for producing an A.C. signal whose center frequency is adjustable to conform to the frequency of said subcarrier, phase comparing means coupled to said generating means to compare the phases of said subcarrier signal and said A.C. signal and to provide information according to the deviations in their relative phase, regulating means connected between said phase comparing means and said signal generating means arranged to convert said information into regulating information and to couple said regulating information to said first input terminal of said signal generating means; and means to demodulate said reference signal for developing controlling information in accordance with said frequency errors and for applying the controlling information to said second input terminal of said signal generating means, the frequency of said generating means being proportional to said regulating information and inversely proportional to said controlling information whereby the effect of said frequency errors on said intelligence subcarrier signal is substantially completely eliminated.

2. In a multi-channel telemetering system for processing a complex signal including a reference signal and at least one intelligence FM subcarrier signal: means for storing and subsequently reproducing the complex signal, the frequency of each of the reproduced signals forming the complex signal being subject to frequency shifts; means coupled to the reproducing means and including a delay network for delaying each intelligence subcarrier signal; an intelligence channel for each intelligence subcarrier signal coupled to the output of said delay network; a reference channel coupled to the output of the reproducing means for deriving a control signal corresponding to said frequency shifts; the reference channel and each intelligence channel including a band-pass filter to extract from the complex signal the signal corresponding to its pass-band, a limiter network coupled to the output of the band-pass filter for converting the extracted signal into a limited signal of substantially constant amplitude, a signal generator having two input circuits for selectively adjusting the frequency of the generator to conform to the frequency of the limited signal, phase comparing means coupled to said generator and to said limiter to compare the phases of the limited signal and the output signal from said generator and to provide information according to the deviations in their relative phase, a filter network connected between said phase comparing means and said generator arranged to convert said information into regulating information and to couple said regulating information to one input circuit of said signal generator; and means coupling said control signal from the reference channel to the other input circuit of each generator in each intelligence channel, the frequency of said last-mentioned generator being proportional to said regulating information and inversely proportional to said controlling information, and said controlling information beig proportional to the deviations from the base period of said reference signal.

3. The telemetering system of claim 2 and further including a compensating network in each intelligence channel for additionally employing the regulating information, low-pass filter means coupled to the output of the compensating network for deriving a demodulated version of the transmitted intelligence signal, and a utilization device coupled to the output of said low-pass filter means.

References Cited by the Examiner

UNITED STATES PATENTS

| | | | |
|---|---|---|---|
| 2,668,283 | 2/54 | Mullin | 179—100.1 |
| 2,685,079 | 7/54 | Hoeppner | 179—100.1 |
| 2,689,884 | 9/54 | Raff | 179—100.1 |
| 2,812,510 | 11/57 | Schulz | 179—100.2 |
| 2,904,682 | 9/59 | Rawlins | 179—100.2 |

IRVING L. SRAGOW, *Primary Examiner.*

THOMAS B. HABECKER, *Examiner.*